(12) United States Patent
Zhou et al.

(10) Patent No.: US 9,903,769 B2
(45) Date of Patent: Feb. 27, 2018

(54) METHOD AND AN APPARATUS FOR MEASURING TEMPERATURE OF A FLUID STREAM

(71) Applicant: ROCKWOOL INTERNATIONAL A/S, Hedehusene (DK)

(72) Inventors: Haosheng Zhou, Herlev (DK); Jeroen Petrus Wilhelmus Sap, Hedehusene (DK); Lars Bøllund, Slangerup (DK); Per Steenbjerg, Lejre (DK)

(73) Assignee: Rockwool International A/S, Hedehusene (DK)

( * ) Notice: Subject to any disclaimer, the term of this patent is extended or adjusted under 35 U.S.C. 154(b) by 656 days.

(21) Appl. No.: 14/348,094

(22) PCT Filed: Sep. 21, 2012

(86) PCT No.: PCT/EP2012/068631
§ 371 (c)(1),
(2) Date: Mar. 28, 2014

(87) PCT Pub. No.: WO2013/045357
PCT Pub. Date: Apr. 4, 2013

(65) Prior Publication Data
US 2014/0254627 A1 Sep. 11, 2014

(30) Foreign Application Priority Data
Sep. 30, 2011 (EP) .................................... 11183542

(51) Int. Cl.
*G01K 1/00* (2006.01)
*G01J 5/00* (2006.01)
(Continued)

(52) U.S. Cl.
CPC ............ *G01K 13/02* (2013.01); *C03B 37/055* (2013.01); *C03B 37/07* (2013.01); *G01J 5/00* (2013.01);
(Continued)

(58) Field of Classification Search
USPC .................................. 374/139, 121, 130, 124
See application file for complete search history.

(56) References Cited

U.S. PATENT DOCUMENTS

| 4,040,563 A | 8/1977 | Schairer |
| 2004/0174922 A1* | 9/2004 | Yamashita ............ C21C 5/4673 374/131 |

(Continued)

FOREIGN PATENT DOCUMENTS

| DE | 19925685 A1 | 12/2000 |
| EP | 0806640 A2 | 11/1997 |

OTHER PUBLICATIONS

Translation of DE 19925685.*
International Search Report and Written Opinion for PCT/EP2012/068631 dated Nov. 5, 2012.

*Primary Examiner* — Mirellys Jagan
(74) *Attorney, Agent, or Firm* — Dinsmore & Shohl LLP

(57) ABSTRACT

The present invention concerns a method and an apparatus (12) for measuring the temperature of a fluid stream (11), said apparatus comprising a movable frame (13, 14) having first end facing towards the fluid stream to be measured and an oppositely directed second end; a beam splitter (9) which is movably arranged in the frame for advancement into said fluid stream to open the fluid stream; an optical temperature measurement device (8) for determining the temperature of the fluid stream by measuring the thermal radiation from the fluid stream; and control means for controlling the move- (Continued)

ment of the frame and the beam splitter and controlling the performance of the optical temperature measurement device.

19 Claims, 9 Drawing Sheets

(51) Int. Cl.
*G01K 13/02* (2006.01)
*C03B 37/07* (2006.01)
*C03B 37/05* (2006.01)
*G01J 5/10* (2006.01)

(52) U.S. Cl.
CPC ............ *G01J 5/0022* (2013.01); *G01J 5/0037* (2013.01); *G01J 5/10* (2013.01); *G01J 2005/0077* (2013.01)

(56) References Cited

U.S. PATENT DOCUMENTS

| | | | | |
|---|---|---|---|---|
| 2004/0240518 | A1* | 12/2004 | Memoli | G01J 5/0044 374/139 |
| 2009/0074028 | A1* | 3/2009 | Lamp | G01J 5/02 374/139 |
| 2009/0262780 | A1* | 10/2009 | Uebber | B22D 2/00 374/139 |
| 2010/0008395 | A1* | 1/2010 | Daniel | G01K 11/006 374/139 |
| 2012/0140787 | A1* | 6/2012 | Abel | G01J 5/00 373/60 |
| 2014/0321504 | A1* | 10/2014 | Neyens | G01K 11/06 374/139 |
| 2016/0151178 | A1* | 6/2016 | Sedlmayr | C22B 9/223 310/179 |

\* cited by examiner

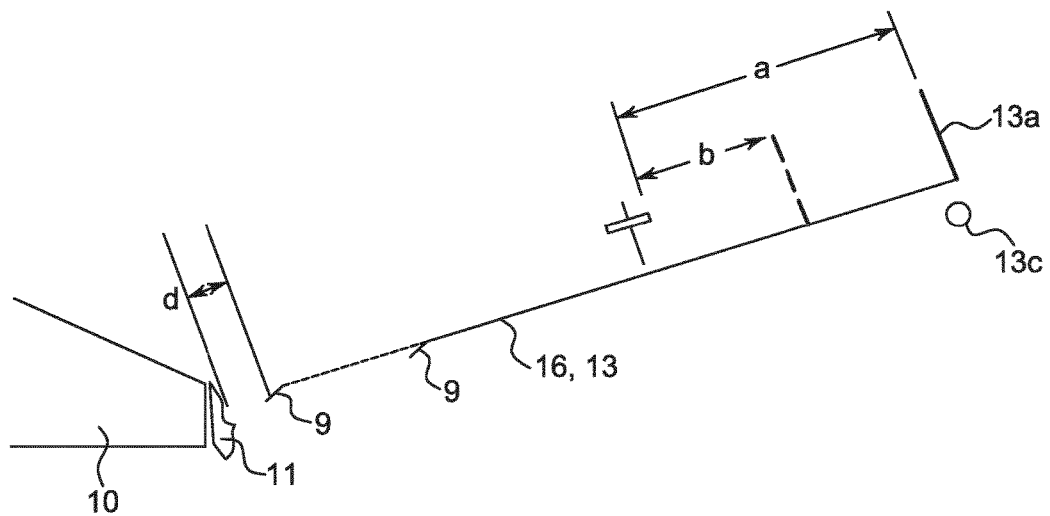
FIG. 9
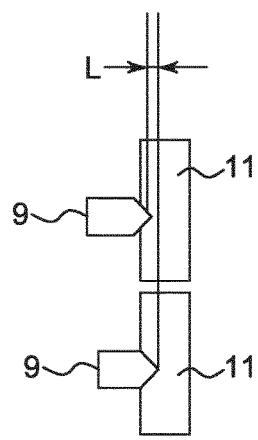
FIG. 10a
FIG. 10b

METHOD AND AN APPARATUS FOR MEASURING TEMPERATURE OF A FLUID STREAM

CROSS-REFERENCE TO RELATED APPLICATIONS

This application is the U.S. National Phase of PCT/EP2012/068631 filed Sep. 21, 2012, which claims priority of European Patent Application 11183542.7 filed Sep. 30, 2011.

FIELD OF THE INVENTION

The present invention relates to a method and an apparatus for measuring temperature of a fluid stream.

BACKGROUND OF THE INVENTION

It is very often of importance to know the temperature of industrial processes to optimize the process, e.g. in relation to fuel consumption or process control.

Examples of systems for measuring a melt beam temperature are known from e.g. U.S. Pat. Nos. 4,297,893, 4,812,151 or EP 0 080 963. However, none of these more automated temperature measurement systems are suitable for measuring the elevated temperature of the molten raw material in mineral wool production.

However, also when producing mineral wool it is important to know the melt temperature. In mineral wool production raw materials are melted in a furnace and the melt flows through a siphon to a spinning device, such as a high speed wheel, to produce fibres.

The temperature of the melt is up to 1500° C., and the properties of the fibres produced are dependent on the precise temperature, and further the melt temperature has a significant impact on the fuel consumption and on the wear and tear of the equipment.

Temperature of the melt is however difficult to measure because of the very high temperature and adverse conditions.

Furthermore the temperature at the surface of the melt beam is considerably lower than the core temperature inside the melt beam, and ideally it is this melt beam core temperature, which should be measured.

Traditionally temperature measurement has been done manually by a person with either a contact thermometer, such as a thermo couple, measuring the core temperature of a melt beam, or a contactless thermometer of some kind, e.g. a pyrometer, which has an optical system and detector and measures thermal radiation from the melt beam, i.e. the surface temperature of the melt beam. Consequently, the measurements are subject to error. Moreover, such measurements are labour intensive to perform and hence costly.

SUMMARY OF THE INVENTION

It is therefore an object to provide an automated temperature measurement method and system which is more accurate and less labour intensive and less costly.

This object is achieved by a method of measuring the temperature of a fluid stream, said method comprising the steps of providing a fluid stream of a molten material, such as molten stone, providing a beam splitter in said fluid stream to open the fluid stream, and determining the temperature of the fluid stream by a contactless temperature measurement device.

The invention further provides an apparatus for measuring the temperature of a fluid stream, said apparatus comprising a beam splitter arranged to open the fluid stream; a contactless temperature measurement device for determining the temperature of the fluid stream; and control means for controlling the performance of the contactless temperature measurement device.

By the invention it is realised that in order to measure the temperature inside the melt, the melt beam may be opened with a beam splitter and the core temperature measured with the optical temperature measurement device, such as a pyrometer. According to the invention it is found that the pyrometer may advantageously be used to measure the temperature during the process of opening the melt beam and thereby determining when the fluid stream (or melt beam) is opened sufficiently to obtain a temperature reading corresponding to the core of the fluid stream. Furthermore, the method provided according to the invention is advantageous since an automated temperature measurement in a fluid steam of molten material, in particular molten stone, hereby becomes possible. By opening the melt is meant that the relatively cooler surface of the melt stream is disturbed so that the relatively hotter core is exposed.

Preferably, the method includes an intermediate step of scanning the fluid stream with the contactless temperature measurement device to determine the lateral position of the fluid stream for positioning the beam splitter, and preferably this scanning also includes calculating the centre line of the fluid stream based on the lateral scanning. Hereby, a simple and reliable way of locating the fluid stream is provided. A fluid stream of molten stone being poured out of a siphon may shift somewhat from side to side over time, e.g. due to wear and tear of the siphon or due to maintenance work, but by using the contactless measurement device to record a lateral temperature profile and thereby locate the significant temperature differences where the side edges of the fluid stream are, a reliable determination of the exact position of the fluid stream is achieved. When the system knows the position of the side edges the centre of the fluid stream is calculated as the middle position between the two side edges. Other calculation methods may be used without departing from the invention, but this simple way of determining the centre line of the fluid stream is presently preferred. Hereby, the method is self-calibrating in relation to position. Preferably, the contactless temperature measurement device is an optical temperature measurement device, such as a pyrometer. The contactless temperature measurement device may alternatively or additionally include an infrared camera.

In order to obtain as accurate a temperature measurement as possible, it is preferred that the splitter is advanced into the fluid stream at the predetermined centre line thereof.

In one preferred embodiment the splitter is advanced into the fluid stream until an increase in temperature above a predetermined value is registered. The increase itself signals that the fluid stream is opened and when the level of the temperature measurements are then stabilised at a higher level than before the splitter was advanced, this higher measurement corresponds to the "inside" temperature of the hot fluid stream. In another embodiment the splitter is advanced a predetermined distance into the fluid stream.

When the splitter is advanced to its advanced position, the splitter is according to one embodiment maintained inside the fluid stream until a maximum temperature measurement is obtained and/or for a maximum predetermined time period.

The beam splitter may advantageously be movably arranged for movement into and out of the fluid stream. Preferably, the apparatus also comprises means for moving the beam splitter in two mutually orthogonal directions.

By the invention, it is found advantageous that the temperature is constantly measured, since the temperature measurements are used to control the automated temperature measurement process including locating the position of the hot fluid stream of molten material. The control means according to the invention governs the movement of the splitter between a retracted position and a predetermined distance into the fluid stream.

In order to ensure an acceptable life time the splitter is water cooled according to a preferred embodiment of the invention. The splitter may in one embodiment be designed as an inclined square hollow body with an upper corner pointing upstream and the diagonally opposite lowermost corner pointing downstream of the fluid stream.

BRIEF DESCRIPTION OF THE DRAWINGS

In the following the invention is described in more detail by way of examples and with reference to the drawings, in which:

FIGS. 5 to 11 are explanatory illustrations on details of the functioning of the apparatus according to the invention.

DETAILED DESCRIPTION OF THE INVENTION

Figure 1:
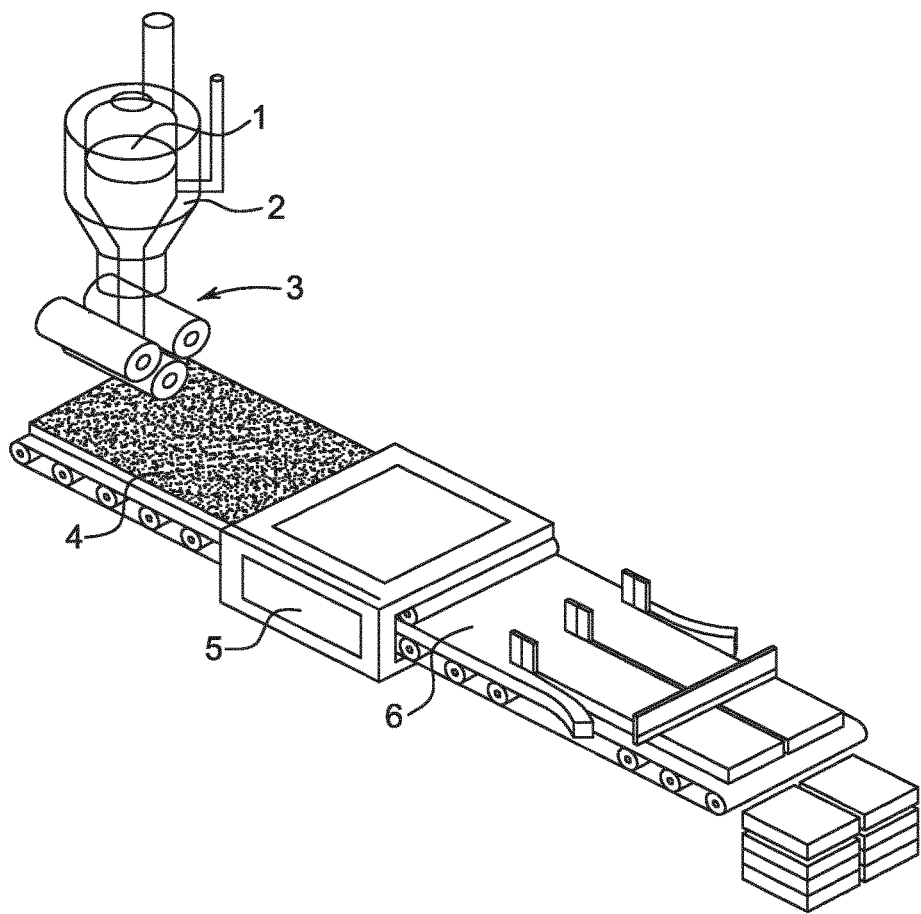
FIG. 1 is a schematic illustration of a mineral wool production line.
Figure 2:
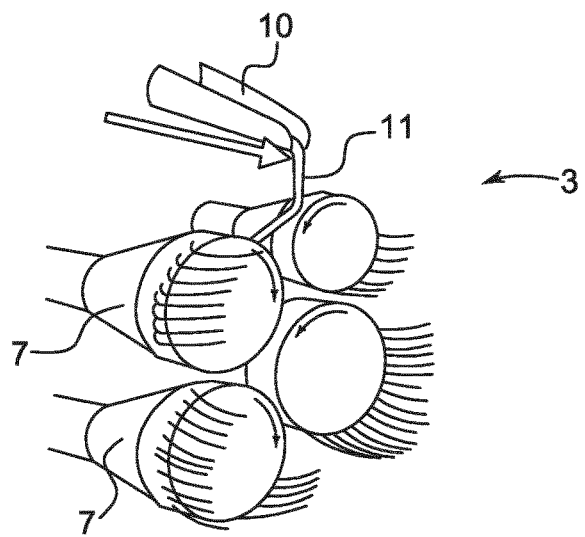
FIG. 2 is a schematic detailed view thereof.
Figure 3:
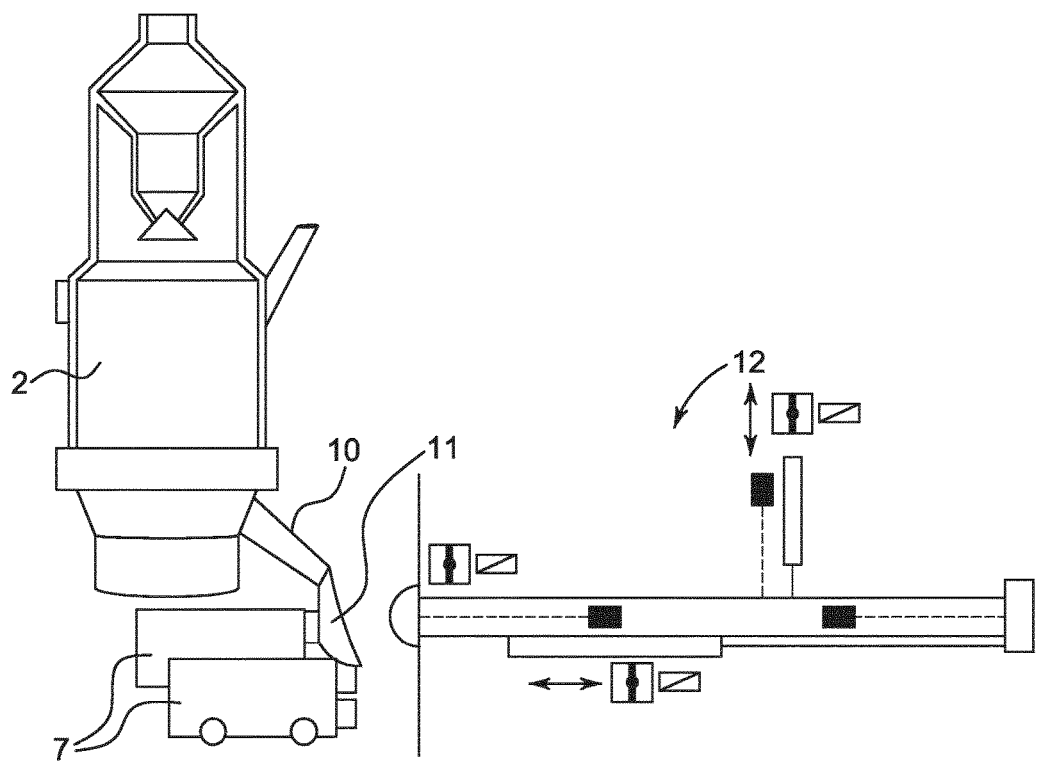
FIG. 3 is a side view schematic illustration of the hot fluid stream of molten stone material out of a siphon and the automated temperature measurement equipment according to the invention.

The present invention relates to contactless temperature measurement of a fluid stream, and in particular to measuring the temperature of a hot fluids stream of molten material 1, such as molten stone for instance in relation to the production of mineral wool fibres, cf. FIGS. 1 to 3. With reference to FIG. 1, stone material 1 is melted in a furnace 2 and poured out of the furnace via a siphon trough 10 (see FIG. 2) and fiberized 3. The fluid stream 11 of molten material is then subjected to a number of spinners 7 (in the illustrated example in FIG. 2, four spinners are provided), whereby the molten material is converted into stone mineral fibres at the fiberizing 3. As shown in FIG. 1, the fibres are then laid onto a belt 4 and then formed into insulation slabs and cured in a curing station 5 before being cut into size at the cutting station 6.

At the fluid stream 11 exiting the siphon 10 a prototype automated temperature measurement apparatus 12 according to the invention (see also FIG. 3) is provided.

In the simplest embodiment of the invention the beam splitter is static and arranged to always be in the fluid stream. Alternatively the fluid stream is controllable in position so the stream can be positioned at the beam splitter. However an automated temperature measurement is more versatile, so it will be discussed in the following.

Figure 4:
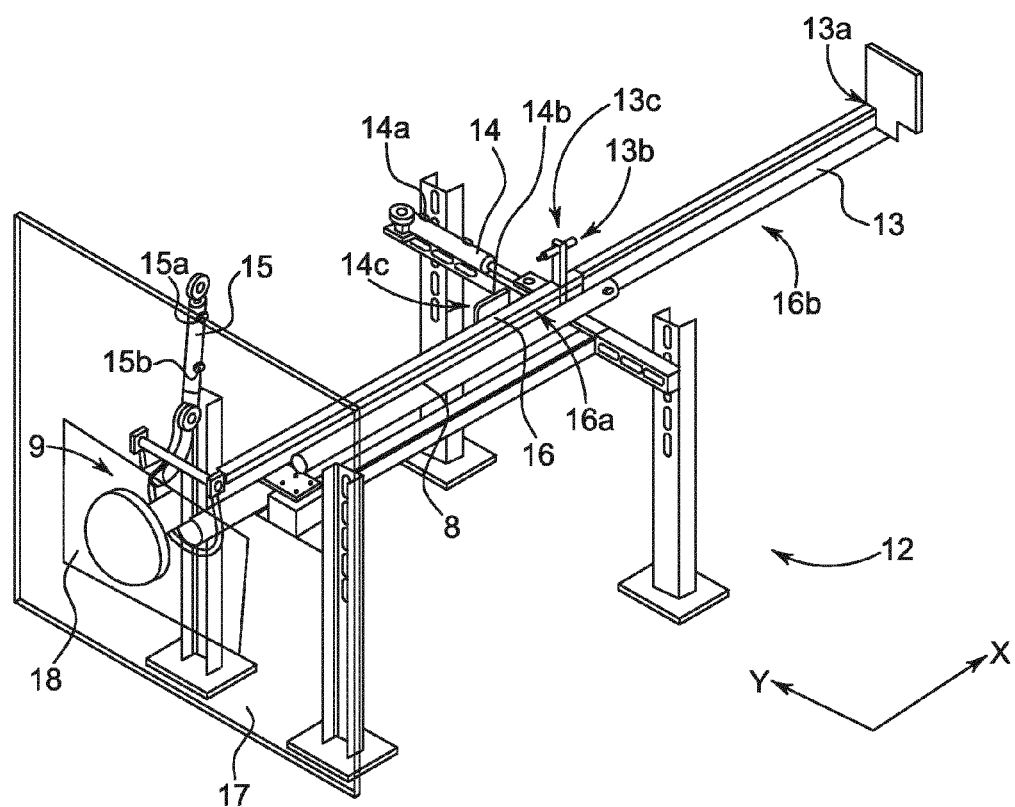
FIG. 4 is a schematic perspective view of an apparatus for automated temperature measurement according to an embodiment of the invention.

This temperature measurement apparatus 12 is a pyrometer based automatically controlled equipment measuring the opened melt beam temperature. This apparatus is shown in FIG. 4. It comprises three hydraulic cylinders 13, 14, 15, a shutter 18, a splitter arm 16 with an outer lance 16a and an inner lance 16b, and a water cooled splitter head 9 fixed to the inner lance 16b, a pyrometer 8, and two ultrasonic distance sensors 13c, 14c (x-DS and y-DS) and their reflection plates 13a, 14b, as well as a flow detector (not shown) mounted at the cooling water outlet. Additionally, four proximity switches are used to detect the cylinder positions.

In the following explanation of the apparatus references are made to the x and y directions that are mutually perpendicular. By the x-direction is meant the direction of the advancement of the beam splitter and by the y-direction is meant the direction of the lateral movement of the pyrometer.

The apparatus 12 is preferably situated on the chamber roof of the spinner station 7. To protect the shutter cylinder 15 and the pyrometer 8, a water cooled plate 17 is mounted on the spinner chamber wall.

With reference to FIG. 4, the functions of the individual parts in the apparatus are:

The splitter arm 16 comprises a water cooled head 9 for splitting the fluid stream 11, an inner lance 16b connected to the x-hydraulic cylinder 13, and an outer lance 16a connected to the y-hydraulic cylinder 14.

The x-hydraulic cylinder 13 controls the movement of the inner lance 16b at x-direction to open the fluid stream 11.

The y-hydraulic cylinder 14 controls the movement of the outer lance 16a at y-direction to find the melt beam centre.

The shutter cylinder 15 opens and closes of the shutter 18.

The shutter 18 is provided to prevent flames from siphon 10 and splashed melt droplets from the fluid stream 11 to the spinner chamber roof.

The pyrometer 8 is used not only for measuring the melt temperature but also for determining the melt beam edges at y-direction. The pyrometer 8 is situated under the outer lance 16a. With the movement of the y-cylinder, the pyrometer 8 rotates with the splitter arm 16.

The x-distance ultrasonic sensor 13c is used to measure the displacement of the inner lance 16b. The position when the rod of the x-hydraulic cylinder 13 is at fully extended position is defined as the home position of the splitter arm 16 at x-direction.

The y-distance ultrasonic sensor 14c is used to measure the displacement of the outer lance 16a. The position when the rod of the y-hydraulic cylinder 14 is at fully extracted position is defined as the home position of the splitter arm 16 at y-direction.

The water cooled plate 17 is provided to protect the shutter cylinder 15 and the pyrometer 8.

The proximity switches 15a and 15b detect the positions of the shutter cylinder 15. The main purpose of the use of the two switches 15a, 15b is to detect whether the shutter 18 is in either close state or in open state. The home position detected by the switch 15b indicating the shutter 18 is at close state, while the shutter cylinder position detected by the switch 15a indicating the shutter 18 is at open state.

Switches 13b and 13a detect the x-cylinder positions. The main purpose of the use of the switch 13a is to detect whether the x-cylinder 13 is at its home position, while the x-cylinder position detected by the switch 13b is used to stop the x-cylinder 13.

The Principle of the Temperature Measurement Apparatus

Figure 5A:
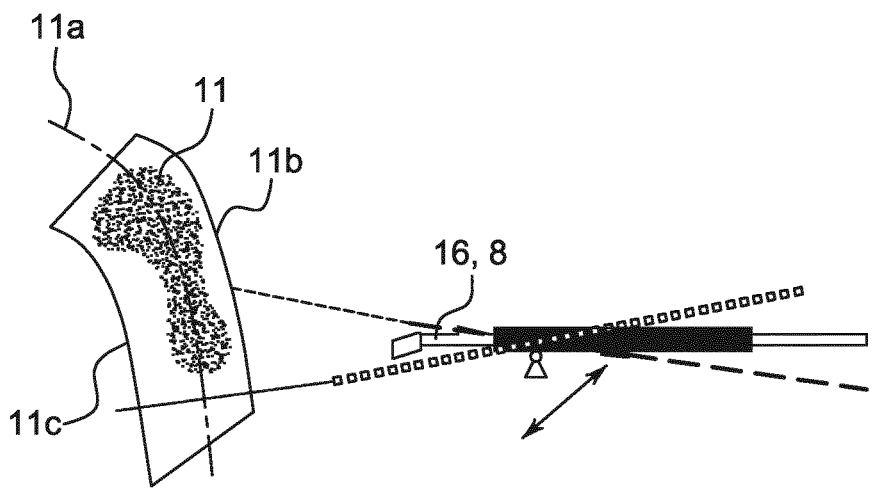
Figure 5B:
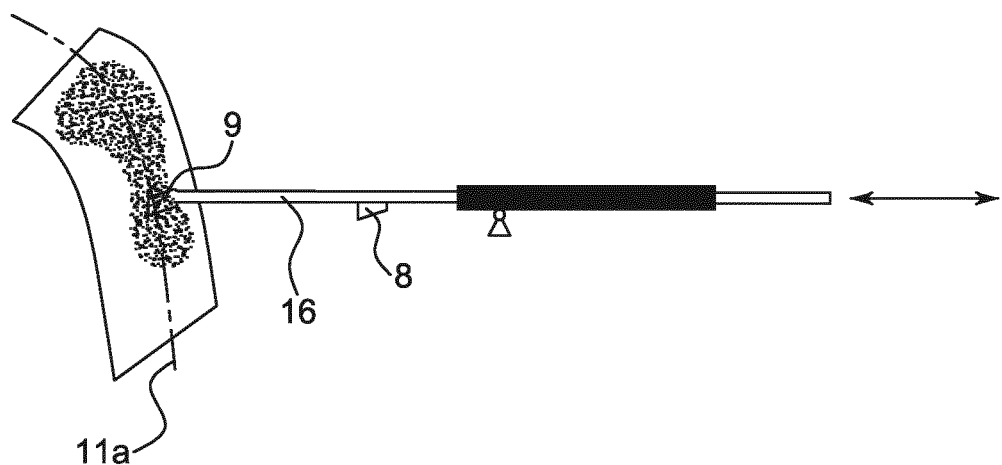

The movement of the splitter arm 16 has two main steps:

First, the splitter arm 16 rotates with the movement of the y-cylinder rod, meanwhile the pyrometer 8 scans the fluid stream 11, and detects the melt beam edges 11b, 11c and finds the melt beam centre 11a (see Step a) in FIG. 5).

Secondly, the splitter head 9 approaches to and opens the fluid stream 11 for subsequent pyrometer temperature measurement (Step b) in FIG. 5).

In more detail, the method performed by the apparatus includes the following sequences:

1. Initiation

The shutter 18 is at close state. The proximity switch 15b detects whether the shutter 18 is at the close state, if not, the shutter-cylinder 15 should withdraw and close the shutter 18 which can be detected by switch 15a.

The x-cylinder 13 is at home position. The proximity switch 13a detects whether the x-cylinder 13 is at home position, if not, the x-cylinder 13 should move backwards to its fully extended position.

The y-cylinder 14 is at home position. To determine whether the y-cylinder 14 is at home position, the distance between the 14c and the reflection plate 14b (as shown in FIG. 3, a) should be equal to a set value. Otherwise, the y-cylinder 14 should move backwards to its fully extracted position.

2. The Cooling Water Passing the Splitter

A signal from the flow detector is used to check whether there is enough cooling water passing the splitter 9. If the cooling water flow is not big enough, then an alarm shall be given to the operators and no further splitter actions should be performed until sufficient cooling is provided.

3. The Melt from the Siphon

The apparatus can work only when there is melt flowing out of the siphon. This may be determined by ensuring that the automated temperature measurement is only carried out if spinner or spinners 7 are consuming more than a predetermined amount of power, such as more than 8 kW.

4. Open the Shutter

The shutter 18 should be opened first before the splitter arm 16 starts to work. The proximity switch 15a gives a signal when the shutter 18 is fully opened.

Figure 6A:
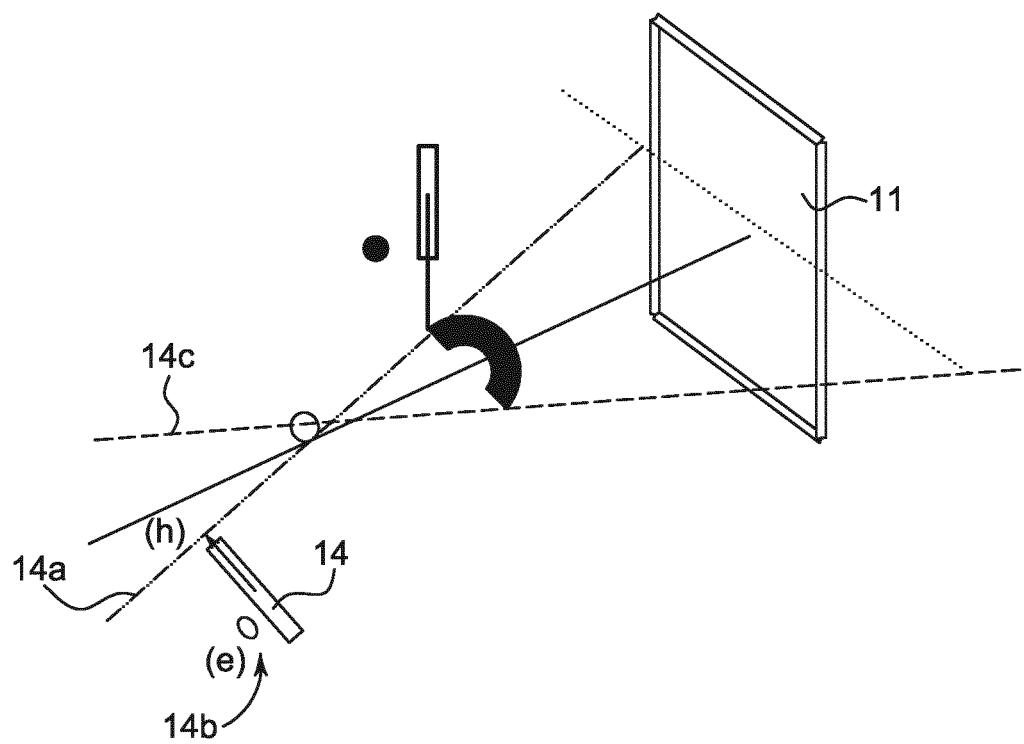
Figure 6B:
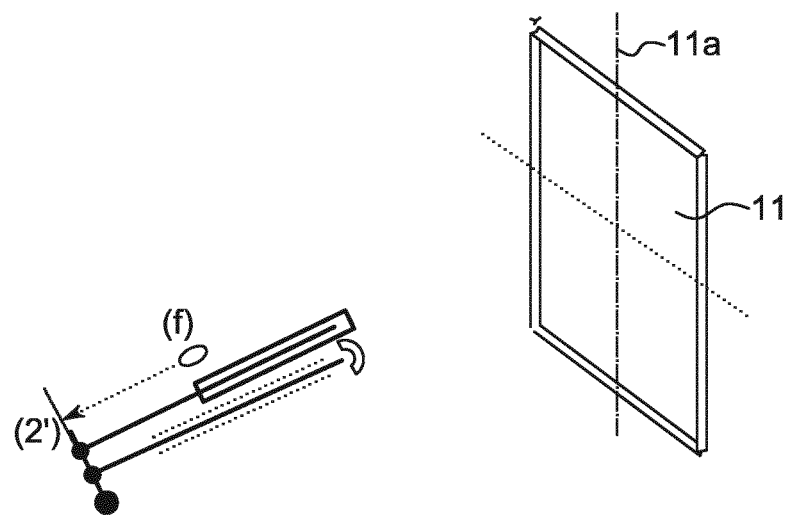
Figure 7:
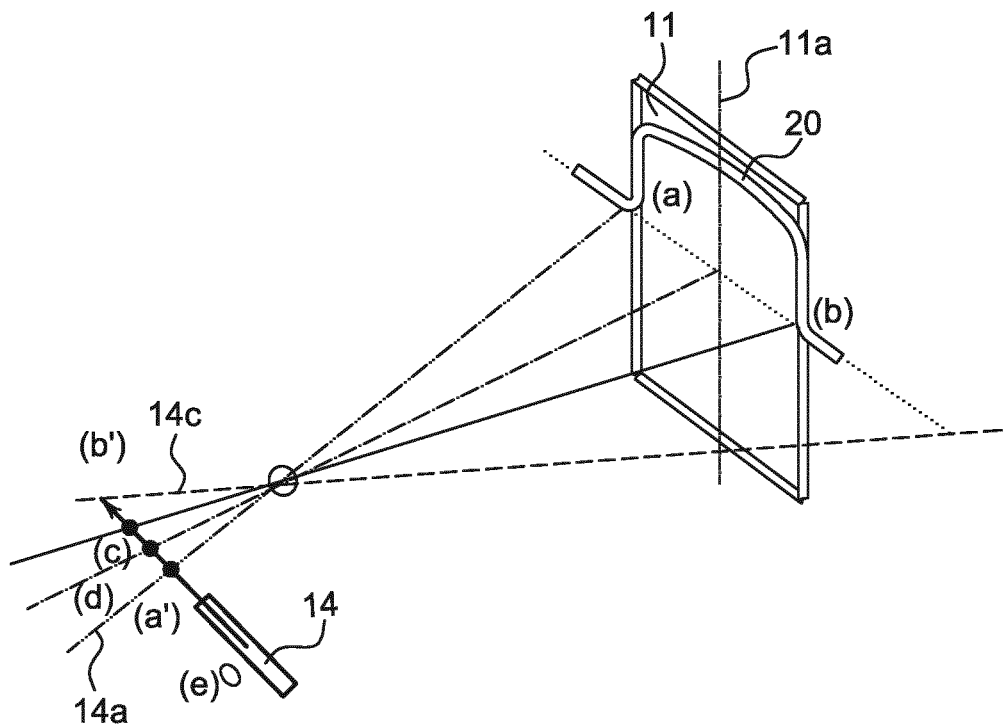

5. The Y-direction Movement:

The y-cylinder rod moves forward from its home position 14a (see FIG. 6a) to its fully extended position (14c). During this movement, the profile of the measured pyrometer temperature 20 can be described as following (shown in FIG. 7): first, an error signal INV (a set temperature of e.g. 1200° C. is used to represent the error signal) is given by the pyrometer 8 before the pyrometer measurement focus area reaches the melt surface; then, the pyrometer temperature jumps sharply as the pyrometer spot touches the melt surface (point (a), the rod position is at (a')); and, the pyrometer temperature keeps at a quite stable and a high level (around 1450° C.) when the pyrometer spot is at the melt surface; finally, the pyrometer temperature goes back to an error signal as the pyrometer spot moves out of the melt surface (point (b), the rod position is at c). Therefore, the melt beam edges can be determined by the signals of the two sharp temperature changes at points (a) and (b) of the temperature profile 20. The cylinder rod stops when the pyrometer spot just leave the melt beam edge at the point 1. In the program, the beam edge is regarded as to be detected when the pyrometer temperature jumps up/or down to for example 1350° C.

When the pyrometer spot touches point 1 and just leave the point (a), the distances (ea', and ec, where e represents the y-DS(i.e. the y-cylinder rod extension), c and a' is the y-reflection plate) between the y-DS and the reflection plate are measured simultaneously by the y-DS. To determine the centre of the melt beam, the cylinder rod then moves backwards (from c to d) half distance of ca' (cd=0.5(ec−e2')). The cylinder rod moves at the predetermined speed, such as 1.0 cm/s.

6. The X-direction Movement

Figure 8:
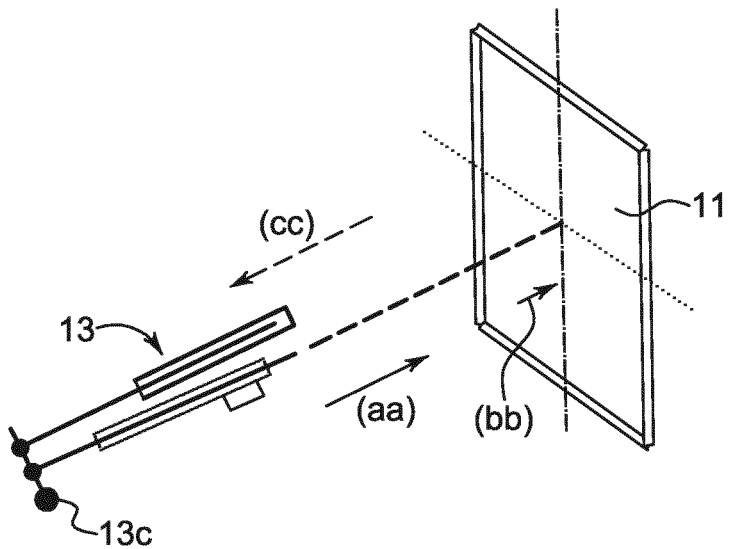

FIG. 8 shows the three steps of the x-cylinder 13 movement after the melt centre has been found. At first (aa), the x-cylinder 13 moves forwards quickly to a certain position; then (bb) the x-cylinder 13 moves very slowly to the last distance and opens the melt beam; and then (cc) after the pyrometer temperature measurement, the x-cylinder 13 moves backwards quickly to its home position.

The home position (solid line in FIG. 9) of the x-cylinder 13/splitter 9, 16 is detected by the proximity switch 13c.

The Opened Melt Beam and the Temperature Measurement

Figure 11:
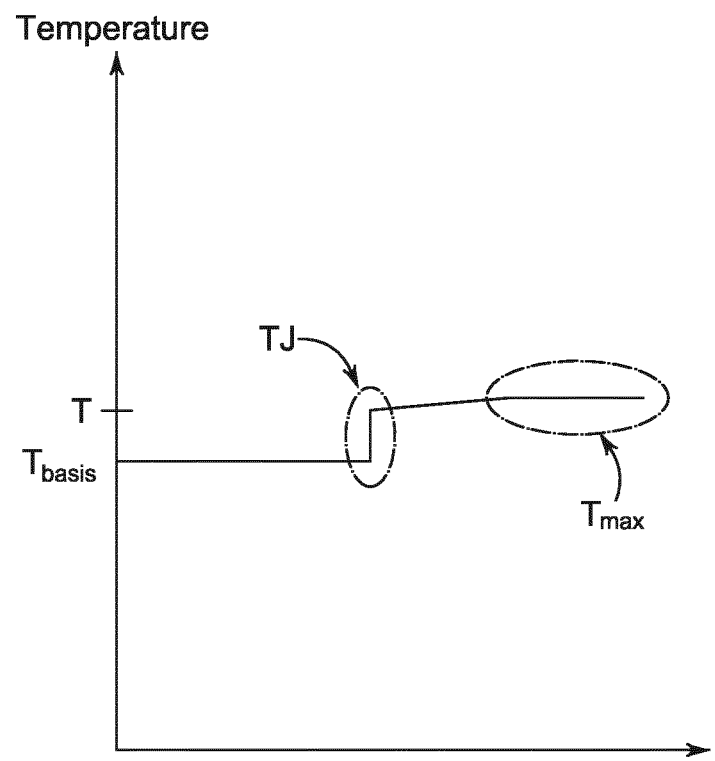

FIG. 10 shows the principle of the determination of the opened fluid stream 11 by the melt splitter 9. When the melt splitter head 9 touches the melt beam surface (shown in FIG. 10a), a temperature jump can be detected by the pyrometer 8, as shown in FIG. 11. It is assumed that the fluid stream 11 is opened when the temperature jump (TJ) is larger than 20° C., as shown in FIG. 11. The temperature jump is calculated as: $(T-T_{basis})>20°$ C., where T is the measured temperature after the splitter 9 is at slow movement mode (dynamic value), and $T_{basis}$ is the measured temperature when the splitter 9 starts the slow movement mode (static value in a measurement).

The temperature jump TJ indicates the melt is opened slightly by the splitter. Then the x-cylinder 13 moves further forwards into the melt 11 (L as shown in FIG. 10, L is termed as penetration depth hereafter). The resident time of the splitter head 9 in the fluid stream 11 will in a preferred embodiment last 1 minute. The measured maximum temperature $T_{max}$ in a minute is regarded as the melt beam core temperature. Furthermore, the measured melt temperature should be in a certain range, for example between 1400 and 1550° C. Otherwise, an alarm will be given to the operators.

To avoid the splitter head 9 hits the siphon 10 and thereby damage either the splitter 9 or the siphon 10, the displacement of the melt splitter 9 is limited.

7. The X- and Y-cylinders Restoration and Close the Shutter:

After the melt beam temperature measurement, the x-cylinder rod moves quickly at a speed of e.g. 5 cm/s back to its home position, then, the shutter 18 is closed, and finally the y-cylinder 14 goes back to its home position.

The sequences taking place as well as the movements of the individual parts during the temperature measurement, i.e. the process loop of the automated temperature measurement, may be summarised as follows:

1. Start
2. Open shutter
3. Find the melt beam edges
4. Find the melt beam centre
5. Melt splitter moves forward and opens the melt beam
6. Temperature measurement and max. temperature
7. X-cylinder moves back to home position
8. Close the shutter
9. Y-cylinder moves to home position.

Figure 12:
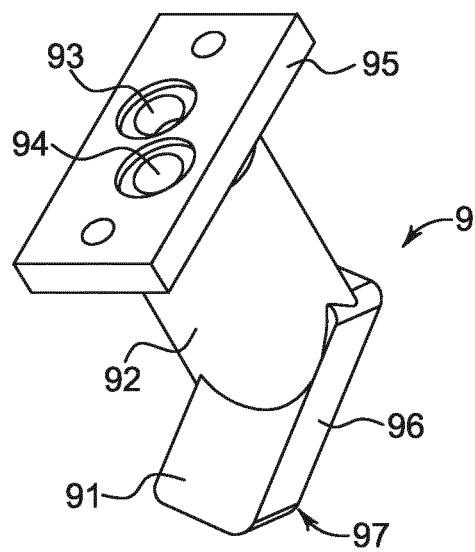
FIGS. 12 to 14 are perspective, top and side views—respectively of a preferred embodiment of the splitter head according to the invention.
Figure 13:
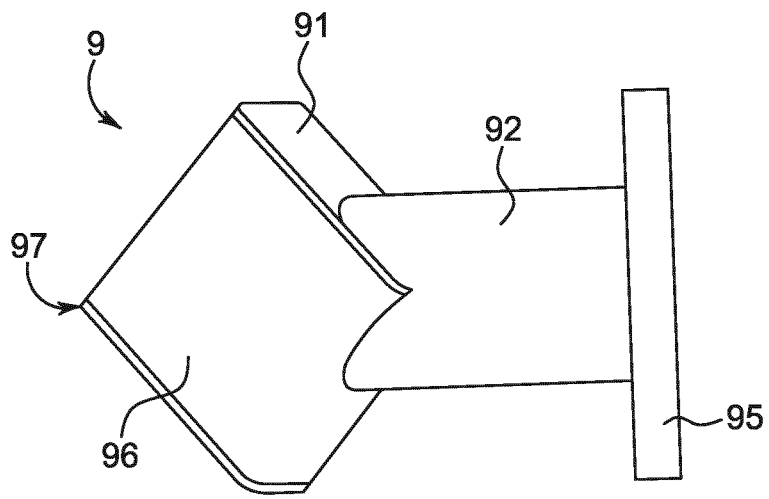
Figure 14:
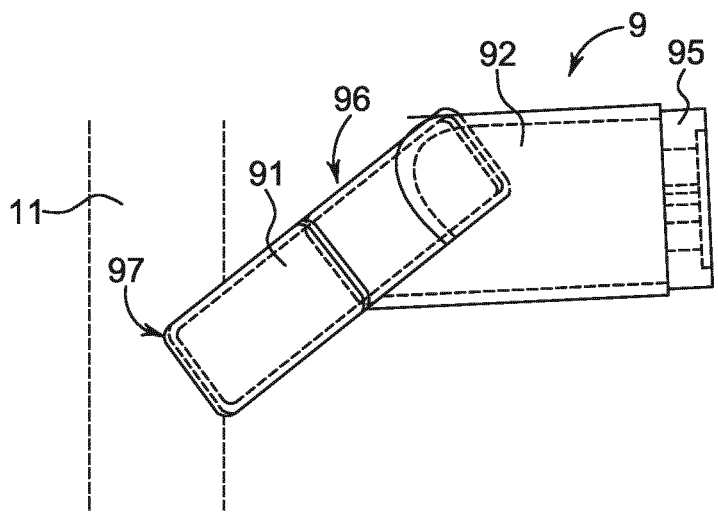

In the FIGS. 12 to 14, a presently preferred embodiment of the splitter head 9 is shown. The splitter head 9 comprises a splitter plate 91 which is positioned in an inclined position on a tubular mounting member 92. The tubular mounting member 92 is provided with a mounting plate 95. The splitter plate 91 is hollow and the thereby formed cavity inside is in flow communication with the cavity of the splitter tube 92. In the mounting plate 95, a water inlet 93 and a water outlet 94 are provided for feeding the splitter cavity inside the tube 92 and the splitter plate with for cooling water.

The splitter plate 91 is provided with an essentially square fluid stream reception surface 96 which in the shown embodiment is provided with its lowermost corner as its distal corner 97 which is advanced into the fluid stream 11 (see FIG. 14). The diagonally opposite corner is mounted in the tube 92 hereby fixing the splitter head 9 in an inclined, essentially "diamond-like" configuration. The splitter plate 91 may be made of any suitable material, such as steel plates or the like, which although subject to wear during use is resistant to the temperatures for the relative short time it is inserted in the melt beam.

In a second embodiment it is realised that a continuous monitoring of the melt surface temperature can be performed with a thermographic camera with hot spot detection. Therefore, in comparison with the first embodiment, the step of scanning to find the melt beam is not necessary. In this embodiment three cameras are used and the highest temperature measurement used. In a variant, it may be further simplified by using only two cameras, as this is sufficient in order to have redundancy. The distance from cameras to melt beam may be 2.5-3 m, so it will be relatively safe.

A further advantage by using a thermographic camera is that the picture from the camera can be showed on a monitor for an operator.

At intervals the measured temperature is calibrated by comparison to a melt core temperature achieved by opening the melt with a melt splitter and measuring the temperature with the same thermographic camera as above. By measuring the difference between the surface temperature and the melt core temperature, it is found that the continuous measurement of the surface temperature of the melt beam provides a measurement indicative of the melt core temperature, as the temperature difference at regular intervals is then calibrated. In other words the indicative melt core temperature is provided based on a continuously measured melt surface temperature, which at intervals is calibrated against a measured melt core temperature to establish a value for the temperature difference between core temperature and surface temperature. The indicative melt core temperature may hence be provided as a continuously provided value based on the continuously measured melt surface temperature plus the established temperature difference, which is a constant provided by the calibration when the actual melt core temperature is measured.

In an alternative embodiment, the melt splitter or beam splitter is a torpedo-like member, which is suspended as a pendulum and with a wire attached. An operator can pull the beam splitter away from the beam by pulling the wire. When the wire is then released the torpedo moves or swings by gravity into the melt beam, and the torpedo beam splitter is retracted again after approx. 15 seconds. The torpedo beam splitter is uncooled and has a replaceable nose as the front which impacts the melt beam becomes worn and would therefore need replacement at regular intervals, such as every few months. The precise position of the torpedo beam splitter is found not be critical as long as the melt beam is hit by the torpedo beam splitter. Because of the hot spot detection of the camera positioning is not critical.

This embodiment is technically very simple since there is no need for means for positioning the beam splitter. Further continuous measurement is a major advantage to be able to control the process and further disturbances to the process is minimized as the number of temperature measurements inside the melt may be relatively low and for calibration only.

The invention is described with reference to presently preferred embodiments. However, it is realised that variations and adaptations of some of the features may be provided without departing from the scope of the invention as defined by the accompanying claims. For example it is realised that the method according to the invention may also be used for automated temperature measurements in a fluid stream in other applications than the above described.

The invention claimed is:

1. A method of measuring the temperature of a fluid stream of molten material, said method comprising the steps of:
   providing a fluid stream of a molten material, wherein the molten material is molten stone, the fluid stream having a surface and a core;
   providing a fluid stream splitter in the fluid stream to open a surface of the fluid stream, and
   determining the core temperature of the fluid stream by a contactless temperature measurement device via the fluid stream splitter while the surface of the fluid stream is opened by the fluid stream splitter.

2. A method according to claim 1, whereby the contactless temperature measurement device is an optical temperature measurement device.

3. A method according to claim 1, whereby the contactless temperature measurement device is an infrared camera.

4. A method according to claim 1, whereby the splitter is advanced into the fluid stream at a predetermined centre line thereof.

5. A method according to claim 1, whereby the splitter is advanced into the fluid stream until an increase in temperature above a predetermined value is registered.

6. A method according to claim 1, whereby the splitter is advanced a predetermined distance into the fluid stream.

7. A method according to claim 1, whereby the splitter is maintained inside the fluid stream until a maximum temperature measurement is obtained and/or for a maximum predetermined time period.

8. A method according to claim 1, whereby the temperature is constantly measured.

9. A method according to claim 1, including an intermediate step of scanning the fluid stream with the contactless temperature measurement device to determine the lateral position of the fluid stream for positioning the beam splitter.

10. A method according to claim 9, whereby the scanning includes calculating the centre line of the fluid stream based on the lateral scanning.

11. An apparatus for measuring the temperature of a fluid stream of molten material, the fluid stream having a surface and a core, said apparatus comprising:
    a fluid stream splitter arranged to open the surface of the fluid stream; and
    a contactless core temperature measurement device for determining the core temperature of the fluid stream via the fluid stream splitter while the fluid stream is opened by the fluid stream splitter.

12. An apparatus according to claim 11, wherein the contactless temperature measurement device is an optical temperature measurement device.

13. An apparatus according to claim 11, wherein the beam splitter is water cooled.

14. An apparatus according to claim 11, wherein the beam splitter is movably arranged for movement into and out of the fluid stream.

15. An apparatus according to claim 14, wherein the apparatus comprises means for moving the beam splitter in two mutually orthogonal directions.

16. An apparatus according to claim 11, wherein the apparatus further comprises a control means for controlling the performance of the contactless temperature.

17. An apparatus according to claim 16, wherein the contactless temperature measurement device is adapted to determine the lateral position of the fluid stream and wherein the control means include means for calculating the centre of the fluid stream based on the lateral scanning.

18. An apparatus according to claim 16, wherein the control means controls the movement of the splitter between a retracted position and an advanced position at the fluid stream.

19. An apparatus according to claim 16, wherein the control means further comprise means for automatically performing a measurement cycle.

* * * * *